(12) United States Patent
Ouyang et al.

(10) Patent No.: US 10,094,979 B2
(45) Date of Patent: Oct. 9, 2018

(54) TWO-DIMENSIONAL SQUARE-LATTICE PHOTONIC CRYSTAL WITH ROTATED HOLLOW SQUARE RODS AND ROTATED TRIANGLE RODS

(71) Applicant: Zhengbiao Ouyang, Shenzhen, Guangdong (CN)

(72) Inventors: Zhengbiao Ouyang, Guangdong (CN); Zhiliang Chen, Guangdong (CN)

(73) Assignee: Zhengbiao Ouyang, Shenzhen (CN)

( * ) Notice: Subject to any disclaimer, the term of this patent is extended or adjusted under 35 U.S.C. 154(b) by 0 days.

(21) Appl. No.: 15/822,236

(22) Filed: Nov. 27, 2017

(65) Prior Publication Data

US 2018/0074260 A1 Mar. 15, 2018

Related U.S. Application Data

(63) Continuation of application No. PCT/CN2016/083063, filed on May 23, 2016.

(30) Foreign Application Priority Data

May 27, 2015 (CN) .......................... 2015 1 0280525

(51) Int. Cl.
*G02B 6/122* (2006.01)
*G02B 1/00* (2006.01)

(52) U.S. Cl.
CPC ........... *G02B 6/1225* (2013.01); *G02B 1/005* (2013.01); *G02B 6/122* (2013.01)

(58) Field of Classification Search
CPC .............................. G02B 6/1225; G02B 1/005
USPC ........................................................... 385/14
See application file for complete search history.

(56) References Cited

U.S. PATENT DOCUMENTS

| | | | |
|---|---|---|---|
| 2004/0027646 A1* | 2/2004 | Miller | B82Y 20/00 359/322 |
| 2008/0124037 A1* | 5/2008 | Noda | B82Y 20/00 385/129 |
| 2009/0217977 A1* | 9/2009 | Florescu | H01L 31/02322 136/256 |

* cited by examiner

*Primary Examiner* — Jerry Blevins

(57) ABSTRACT

The present invention discloses a 2D square-lattice PhC with rotated hollow square rods and rotated triangle rods comprising a high-refractive-index dielectric rod and a low-refractive-index background dielectric rod, and providing a 2D square-lattice PhC structure having a large absolute PBG relative value. The unit cell of the square-lattice PhC includes a high-refractive-index rotated hollow square rod, a high-refractive-index triangle rod and a low-refractive-index background dielectric, the hollow square rod has an outer contour being the first rotated square rod and a hollow part with a cross section being the second rotated square rod; the cross section of a high-refractive-index triangular rod is a right-angle triangle located at the hollow part of the square rod, the triangular rods are four right-angled triangular rods, the vertex connecting lines of four triangular rods form a third rotated square rod; the hypotenuse connecting lines of four triangular rods form a fourth rotated square rod.

12 Claims, 14 Drawing Sheets

TWO-DIMENSIONAL SQUARE-LATTICE PHOTONIC CRYSTAL WITH ROTATED HOLLOW SQUARE RODS AND ROTATED TRIANGLE RODS

CROSS-REFERENCE TO RELATED APPLICATIONS

This application is a Continuation Application of PCT Application No. PCT/CN2016/083063, filed on May 23, 2016, which claims priority to Chinese Patent Application No. 201510280525.X filed on May 27, 2015, the entire contents of which are hereby incorporated by reference.

FIELD OF THE INVENTION

The present invention relates to a broadband absolute photonic bandgap (PBG) photonic crystal (PhC), and more particularly, generally to a two-dimensional (2D) square-lattice PhC with rotated hollow square rod and rotated triangle rods.

BACKGROUND OF THE INVENTION

In 1987, the concept of a PhC was respectively proposed by E. Yablonovitch in American Bell Labs when studying how to suppress spontaneous radiation and S. John in Princeton University when studying photon localization. The PhC has a material structure of a dielectric material arranged periodically in space, and is often an artificial crystal formed by two or more than two materials having different dielectric constants.

Control on light is one of main challenges in modern optics. With increasing development of optical communication and computer technology, it becomes more important to control and operate light signals. Since the PhC has the property of allowing light at a specific frequency and a specific direction to pass or forbidding in the PhC, the researches on the PhC have received people's attention.

Because the electromagnetic field mode in an absolute PBG is completely nonexistent, when an electron energy band is superposed with the absolute PBGs of the PhC, the spontaneous radiation is suppressed. The absolute PBGs can change the interaction between a field and a material by controlling the spontaneous radiation and improve the performance of an optical device. The PhC can be applied to semiconductor lasers, solar cells, high-quality resonant cavities and filters.

The distribution of a dielectric material in unit cells of the PhC has a strong impact on the PBGs, the selection of a PBGs has a great impact on the application of the PhC, and particularly, a large absolute PBGs is very effective on the control of broadband signals.

For the light having the frequency in an absolute PBG, it cannot pass any matter for different polarizations and wave vectors. The large PBGs can be used for manufacturing optical waveguides, liquid crystal PhC fibers, negative refractive index imagers, PhC lasers of a defect mode in defect cavities. Large absolute PBGs can suppress spontaneous radiation in PhC lasers of a defect mode, particularly under the condition that the spectral range of spontaneous radiation is very wide. If we desire to obtain PhC resonant cavities with narrow resonant peaks, large absolute PBGs are necessary. In various optical devices, polarization-independent absolute PBGs are very important. Just because many devices of PhCs utilize PBGs, worldwide scientists are striving to design PhC structures with larger absolute PBGs.

SUMMARY OF THE INVENTION

The present invention aims to overcome the defects of the prior art and provide a 2D square-lattice PhC structure facilitating optical circuit integration and having a large absolute PBG relative value.

The technical solution adopted by the invention to solve the technical problem is as follows:

A 2D square-lattice PhC with rotated hollow square rods and rotated triangle rods in the present invention comprises a high-refractive-index dielectric rod and a low-refractive-index background dielectric rod; the PhC structure is formed by unit cells arranged according to square-lattices; the unit cell of the square-lattice PhC includes a high-refractive-index rotated hollow square rod, a high-refractive-index triangle rod and a low-refractive-index background dielectric, the outer contour line of the hollow square rod is a first rotated square rod; a cross section of the hollow part of the hollow square rod is a second rotated square rod; the cross section of a high-refractive-index triangular rod is a right-angle triangle, the triangular rod is located at the hollow part of the square rod, the triangular rods are four right-angled triangular rods, and the vertex connecting lines of the four triangular rods form a third rotated square rod; the hypotenuse connecting lines of the four triangular rods form a fourth rotated square rod; the lattice constant of the square-lattice PhC is a; the first rotated square rod with the rotated angle $\alpha$ of 45° to 60° and a side length b of 0.56a to 0.7a; the second rotated square rod with the rotated angle $\beta$ of 30° to 55° and the side length c of 0.276a to 0.49a; the third rotated square rod with the rotated angle $\gamma$ of 40° to 55° and the side length d of 0.188a to 0.3472a; the fourth rotated square rod with the rotated angle $\omega$ of 26° to 50° and the side length e of 0.173a to 0.382a.

The high-refractive-index dielectric is the one with the refractive index of greater than 2.

The high-refractive-index dielectric is silicon, gallium arsenide or titanium dioxide.

The high-refractive-index dielectric has a refractive index of 3.4.

The low-refractive-index background dielectric is a dielectric with the refractive index of less than 1.6.

The low-refractive-index background dielectric is air, vacuum, magnesium fluoride or silicon dioxide.

The high-refractive-index dielectric is silicon, the low-refractive-index background dielectric is air, the first rotated square rod with the rotated angle $\alpha$ of 45° to 60° and the side length b of 0.56a to 0.7a; the second rotated square rod with the rotated angle $\beta$ of 30° to 55° and the side length c of 0.276a to 0.49a; the third rotated square rod with the rotated angle $\gamma$ of 40° to 55° and the side length d of 0.188a to 0.3472a; the fourth rotated square rod with the rotated angle $\omega$ of 26° to 50° and the side length e of 0.173a to 0.382a; a large absolute PBG relative value is 10%; and the high-refractive-index dielectric is silicon, the low-refractive-index background dielectric is air, the first rotated square rod with the rotated angle $\alpha$ of 55.9° and the side length b of 0.69a; the second rotated square rod with the rotated angle $\beta$ of 30.2° and the side length c of 0.4692a; the third rotated square rod with the rotated angle $\gamma$ of 54.2° and the side length d of 0.34627a; the fourth rotated square rod with the rotated angle $\omega$ of 26.7° and the side length e of 0.36358a; the large absolute PBG structure relative value is 18.936%.

The high-refractive-index dielectric is silicon, the low-refractive-index background dielectric is air, the first rotated square rod with the rotated angle α of 45° to 60° and the side length b of 0.56a to 0.7a; the second rotated square rod with the rotated angle β of 30° to 55° and the side length c of 0.276a to 0.49a; the third rotated square rod with the rotated angle γ of 40° to 55° and the side length d of 0.188a to 0.3472a; the fourth rotated square rod with the rotated angle ω of 26° to 50° and the side length e of 0.173a to 0.382a; the large absolute PBG relative value is 10%; and the high-refractive-index dielectric is silicon, the low-refractive-index background dielectric is air, the first rotated square rod with the rotated angle α of 55.9° and the side length b of 0.69a; the second rotated square rod with the rotated angle β of 30.2° and the side length c of 0.4692a; the third rotated square rod with the rotated angle γ of 54.2° and the side length d of 0.34627a; the fourth rotated square rod with the rotated angle ω of 26.7° and the side length e of 0.36358a; the large absolute PBG structure relative value is 18.936%.

The high-refractive-index dielectric is silicon, the low-refractive-index background dielectric is air, the first rotated square rod with the rotated angle α of 45° to 60° and the side length b of 0.56a to 0.7a; the second rotated square rod with the rotated angle β of 30° to 55° and the side length c of 0.276a to 0.49a; the third rotated square rod with the rotated angle γ of 40° to 55° and the side length d of 0.188a to 0.3472a; the fourth rotated square rod with the rotated angle ω of 26° to 50° and the side length e of 0.173a to 0.382a; the large absolute PBG relative value is 10%; and the high-refractive-index dielectric is silicon, the low-refractive-index background dielectric is air, the first rotated square rod with the rotated angle α of 55.9° and the side length b of 0.69a; the second rotated square rod with the rotated angle β of 30.2° and the side length c of 0.4692a; the third rotated square rod with the rotated angle γ of 54.2° and the side length d of 0.34627a; the fourth rotated square rod with the rotated angle ω of 26.7° and the side length e of 0.36358a; the large absolute PBG structure relative value is 18.936%.

The 2D square-lattice PhC with rotated hollow square rod and rotated triangle rods in the present invention can be widely applied to design of large-scale integrated optical circuits. Compared with the prior art, the present invention has the following advantages:

(1) The PhC structure of the present invention has a very large absolute PBG and can thus bring greater convenience and flexibility to design and manufacture of PhC devices.

(2) In a PhC integrated optical paths, different optical devices in the optical circuit and different optical circuits are respectively easily connected and coupled, and the square-lattice structure can simplify the optical circuit and easily improve the integration degree of the optical circuits.

(3) The designed circuit is compact, the manufacture is easy, and the manufacturing cost is reduced.

These and other objects and advantages of the present invention will become readily apparent to those skilled in the art upon reading the following detailed description and claims and by referring to the accompanying drawings.

The present invention is more specifically described in the following paragraphs by reference to the drawings attached only by way of example.

DETAILED DESCRIPTION OF THE EMBODIMENTS

The terms a or an, as used herein, are defined as one or more than one, The term plurality, as used herein, is defined as two or more than two. The term another, as used herein, is defined as at least a second or more.

Figure 1:
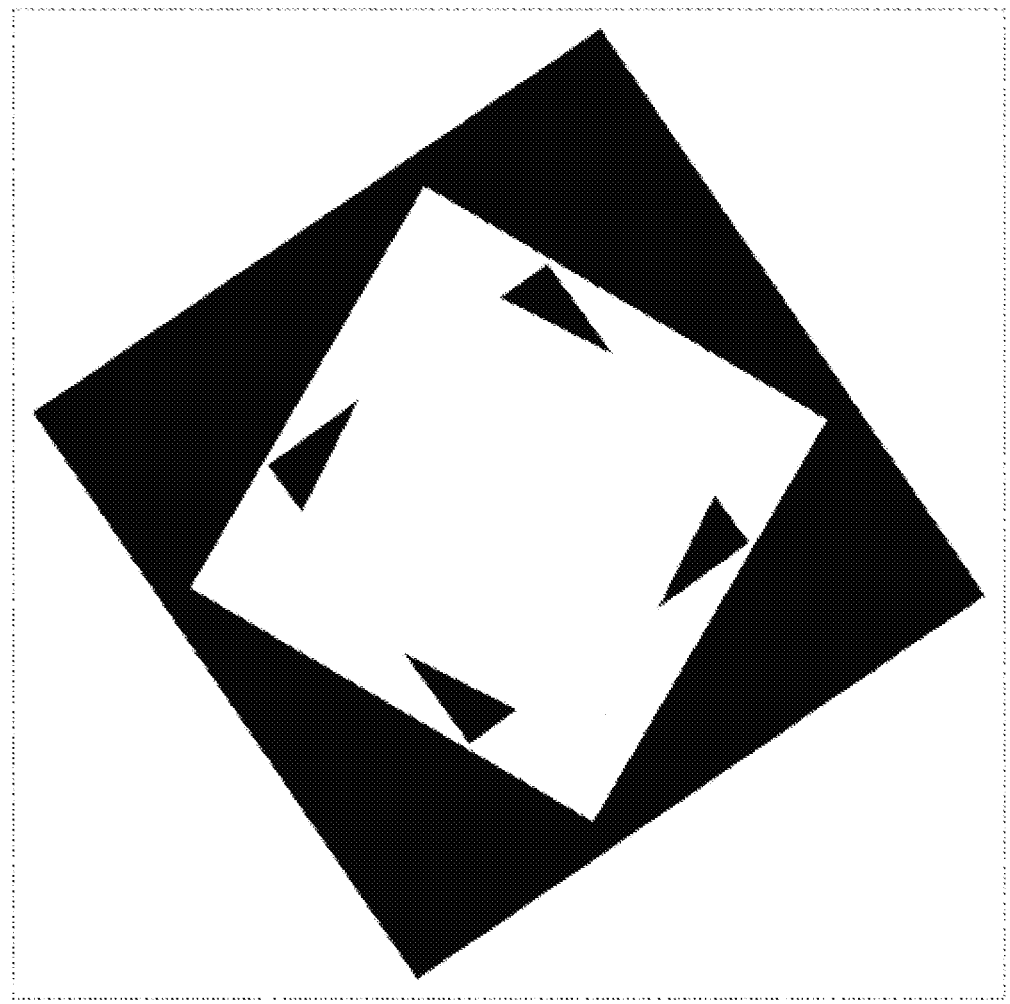
FIG. 1 is a structural schematic diagram of a unit cell of a 2D square-lattice PhC with rotated hollow square rods and rotated triangle rods.
Figure 2:
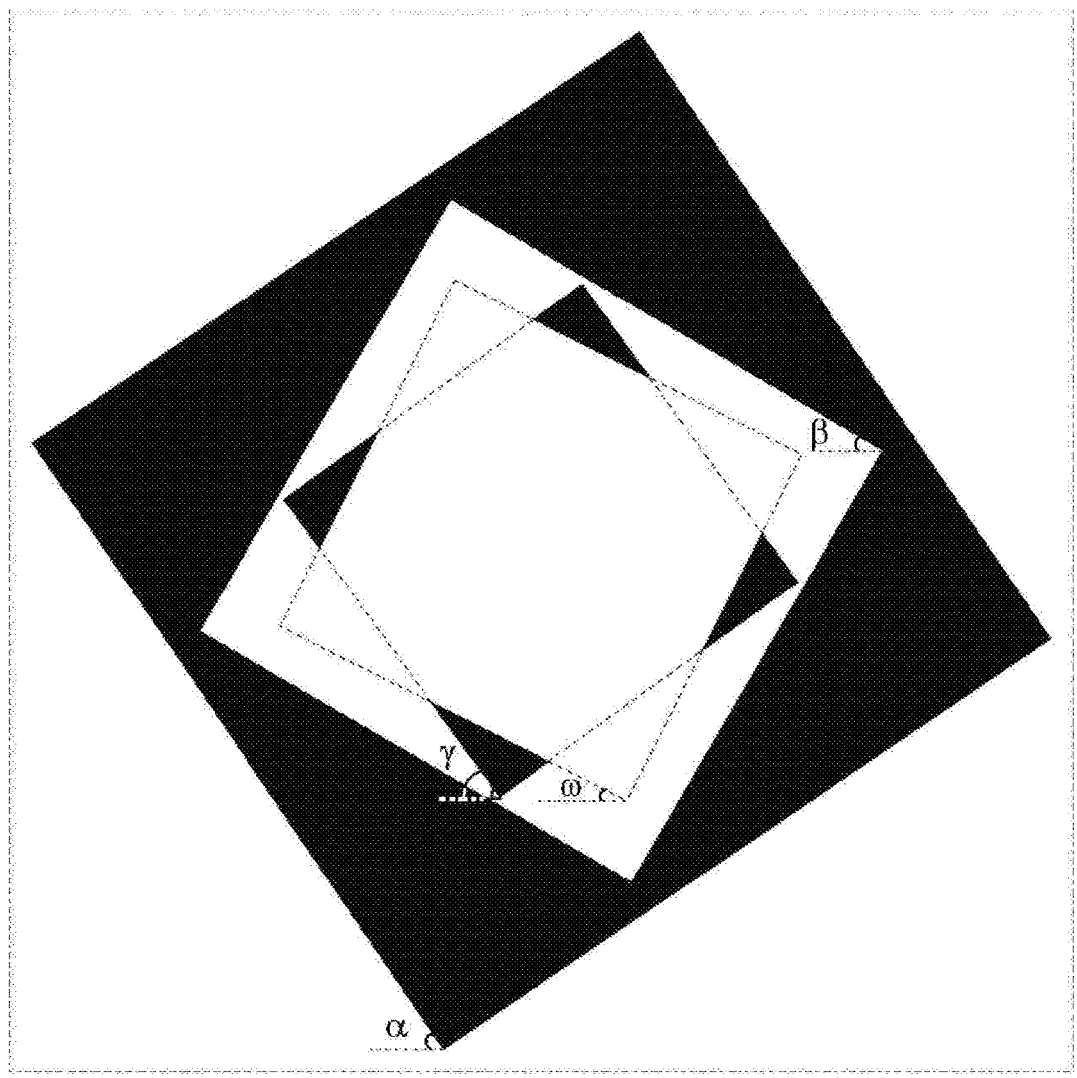
FIG. 2 is a section view of a parameter structure adopting an auxiliary line as shown in FIG. 1.

Referring now to FIG. 1, a 2D square-lattice PhC with rotated hollow square rod and rotated triangle rods in the present invention includes a high-refractive-index dielectric rod and a low-refractive-index background dielectric rod; the PhC structure is formed by unit cells arranged according to square-lattices, and the lattice constant of the square-lattice PhC is a; the unit cell of the square-lattice PhC includes a high-refractive-index rotated hollow square rod, a high-refractive-index right-angle rotated triangle rods and a background dielectric, the background dielectric is a low-refractive-index dielectric; the outer contour of the hollow square rod is a first rotated square rod with the rotated angle α of 45° to 60° and the side length b of 0.56a to 0.7a; the cross section of the hollow part of the hollow square rod is a second rotated square rod with the rotated angle β of 30° to 55° and the side length c of 0.276a to 0.49a; as seen in FIG. 2, the cross section of a high-refractive-index triangular rod is of a right-angle triangle, the rotated triangular rod is located at the hollow part of a square rod, the triangular rods are four right-angled triangular rods, and the vertex connecting lines of the four triangular rods form a third rotated square rod with the rotated angle γ of 40° to 55° and the side length d of 0.188a to 0.3472a; the hypotenuse connecting lines of the four triangular rods form a fourth rotated square rod with the rotated angle ω of 26° to 50° and the side length e of 0.173a to 0.382a; The high-refractive-index dielectric is the one with the refractive index of greater than 2, and the high-refractive-index dielectric is silicon, gallium arsenide or titanium dioxide; the low-refractive-index background dielectric is a dielectric with the refractive index of less than 1.6, and the low-refractive-index background dielectric is air, vacuum, magnesium fluoride or silicon dioxide.

Embodiment 1

Figure 3:
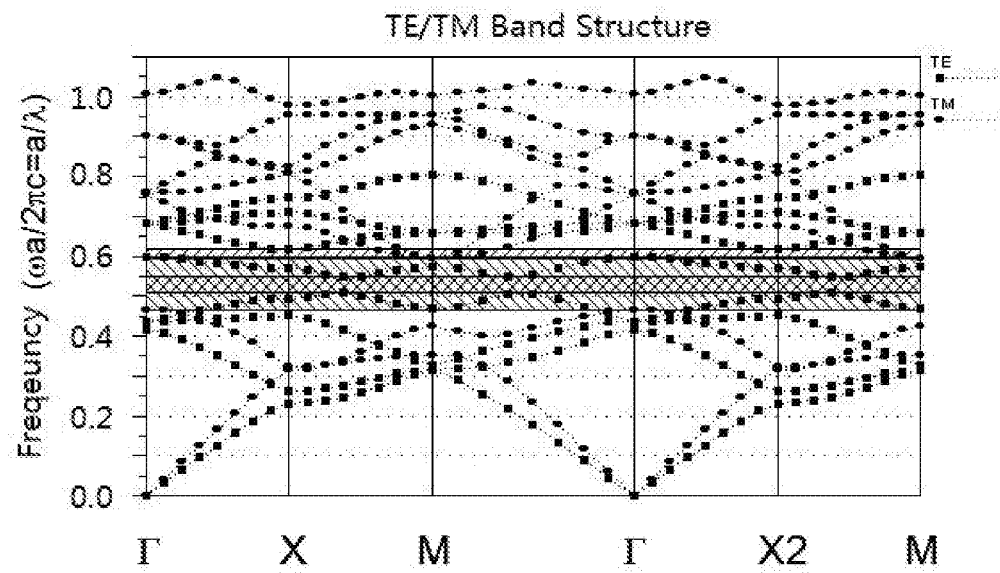
FIG. 3 is a structural diagram of a PBG corresponding to unit cell parameter values adopted in embodiment 1.

The high-refractive-index material is silicon, the low-refractive-index is air, α=45°, β=30.2°, γ=54.2°, ω=26.7°, b=0.69a, c=0.4692a, d=0.34627a, e=0.36358a. It can be known from the numerical simulation result of this embodiment in FIG. 3 that the large absolute PBG relative value is 7.64%.

Embodiment 2

Figure 4:
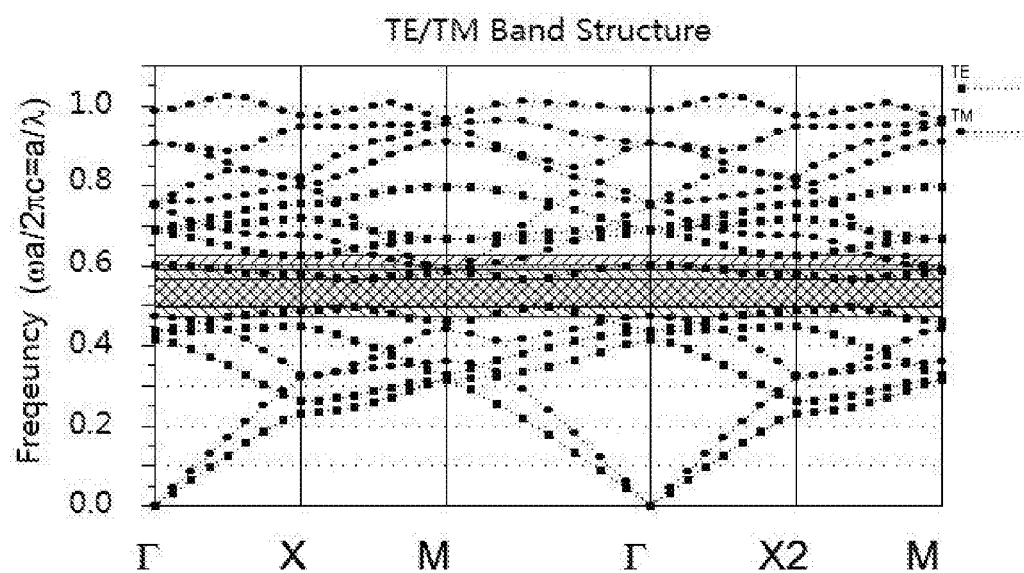
FIG. 4 is a structural diagram of a PBG corresponding to unit cell parameter values adopted in embodiment 2.

The high-refractive-index material is silicon, the low-refractive-index is air, α=50°, β=30.2°, γ=54.2°, ω=26.7°, b=0.69a, c=0.4692a, d=0.34627a, e=0.36358a. It can be known from the numerical simulation result of this embodiment in FIG. 4 that the large absolute PBG relative value is 13.26%.

Embodiment 3

Figure 5:
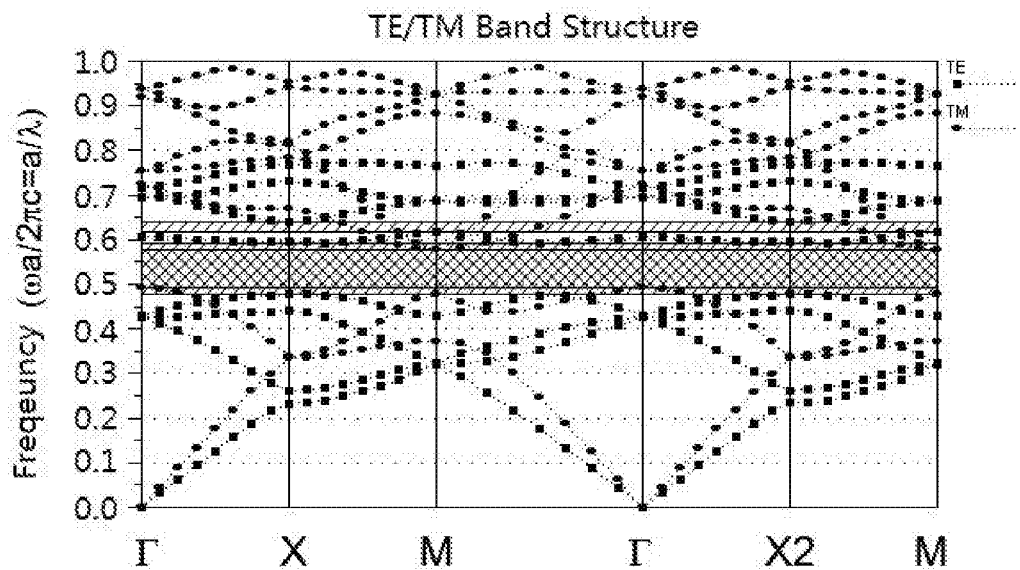
FIG. 5 is a structural diagram of a PBG corresponding to unit cell parameter values adopted in embodiment 3.

The high-refractive-index material is silicon, the low-refractive-index is air, α=60°, β=30.2°, γ=54.2°, ω=26.7°, b=0.69a, c=0.4692a, d=0.34627a, e=0.36358a. It can be known from the numerical simulation result of this embodiment in FIG. 5 that the large absolute PBG relative value is 16.51%.

Embodiment 4

Figure 6:
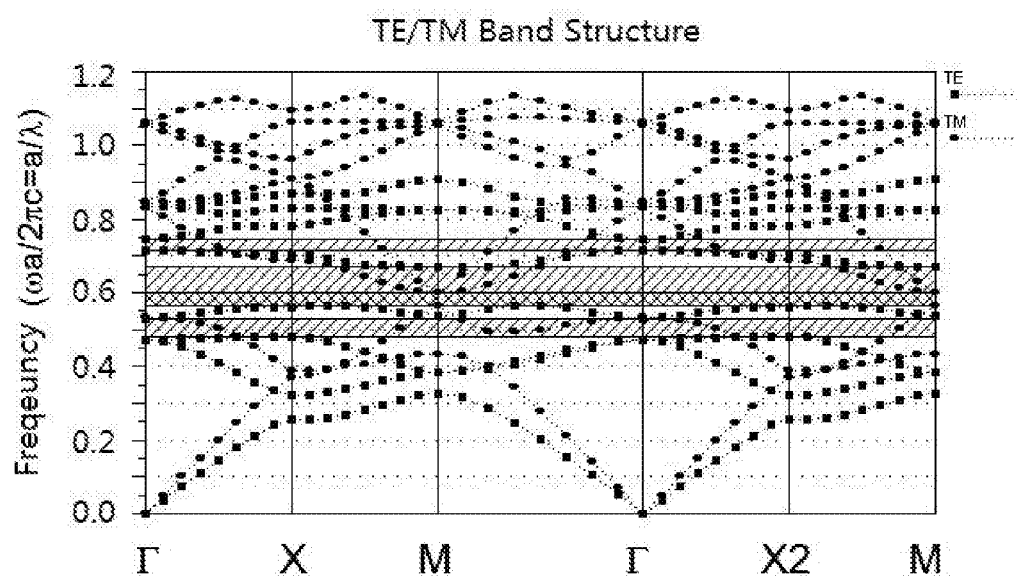
FIG. 6 is a structural diagram of a PBG corresponding to unit cell parameter values adopted in embodiment 4.

The high-refractive-index material is silicon, the low-refractive-index is air, α=55.9°, β=30.2°, γ=54.2°, ω=26.7°, b=0.56a, c=0.3808a, d=0.2810a, e=0.295a. It can be known from the numerical simulation result of this embodiment in FIG. 6 that the large absolute PBG relative value is 6.14%.

Embodiment 5

Figure 7:
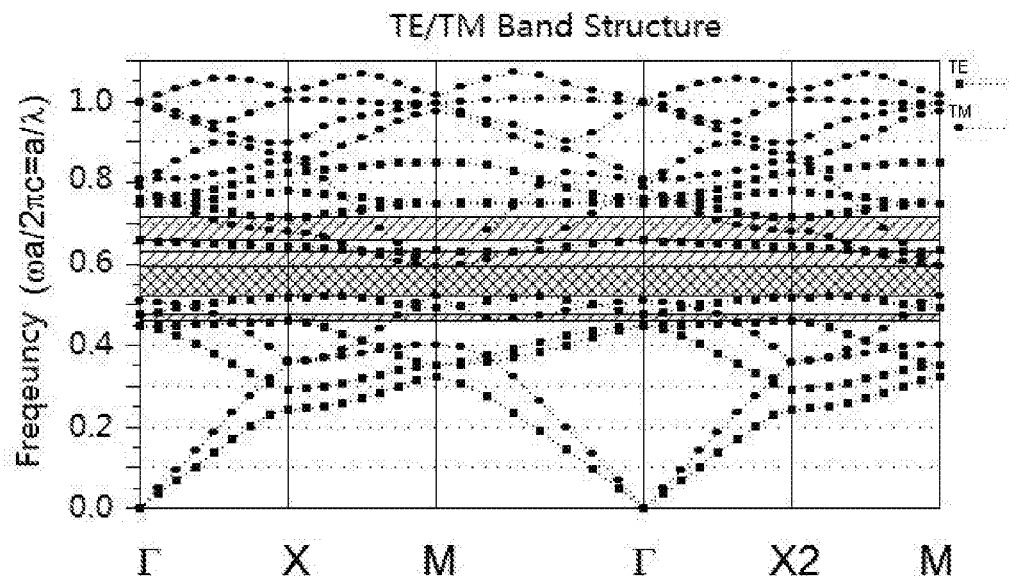
FIG. 7 is a structural diagram of a PBG corresponding to unit cell parameter values adopted in embodiment 5.

The high-refractive-index material is silicon, the low-refractive-index is air, α=55.9°, β=30.2°, γ=54.2°, ω=26.7°, b=0.62a, c=0.4216a, d=0.31114a, e=0.3267a. It can be known from the numerical simulation result of this embodiment in FIG. 7 that the large absolute PBG relative value is 13.32%.

Embodiment 6

Figure 8:
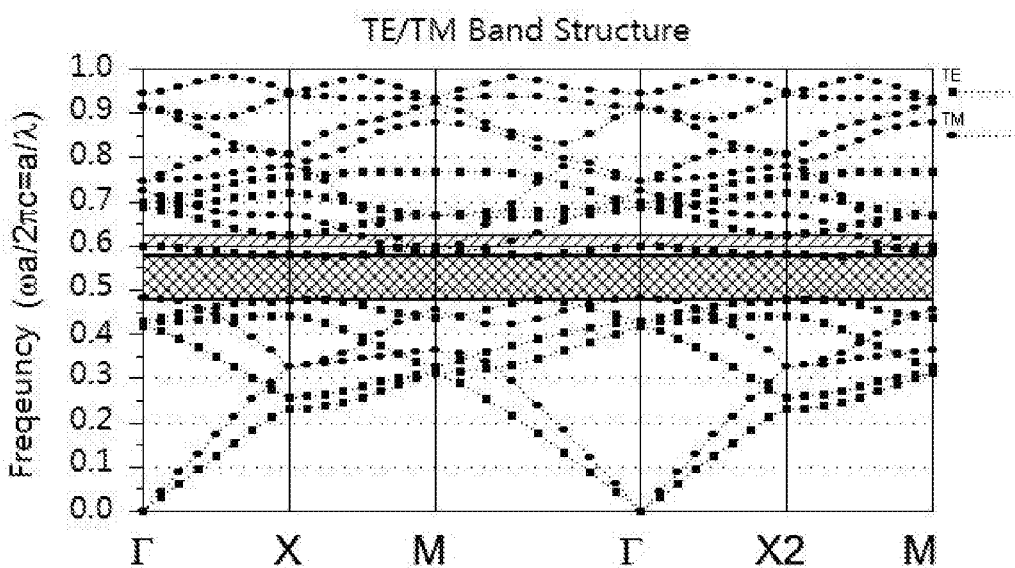
FIG. 8 is a structural diagram of a PBG corresponding to unit cell parameter values adopted in embodiment 6.

The high-refractive-index material is silicon, the low-refractive-index is air, α=55.9°, β=30.2°, γ=54.2°, ω=26.7°, b=0.7a, c=0.476a, d=0.3513a, e=0.3689a. It can be known from the numerical simulation result of this embodiment in FIG. 8 that the large absolute PBG relative value is 18.11%.

Embodiment 7

Figure 9:
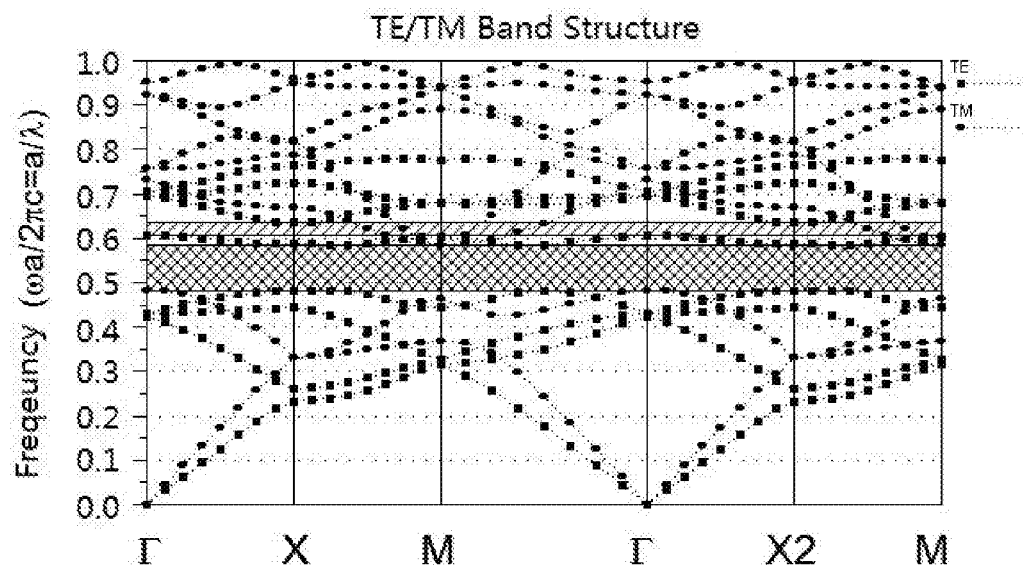
FIG. 9 is a structural diagram of a PBG corresponding to unit cell parameter values adopted in embodiment 7.

The high-refractive-index material is silicon, the low-refractive-index is air, α=55.9°, β=30°, γ=54.2°, ω=26.7°, b=0.69a, c=0.4692a, d=0.34627a, e=0.36358a. It can be known from the numerical simulation result of this embodiment in FIG. 9 that the large absolute PBG relative value is 18.927%.

Embodiment 8

Figure 10:
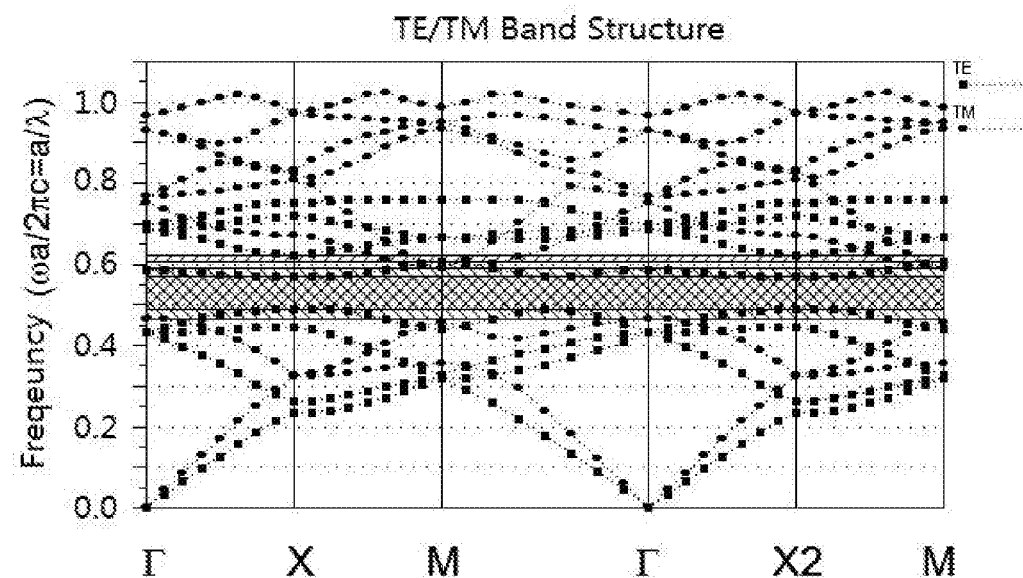
FIG. 10 is a structural diagram of a PBG corresponding to unit cell parameter values adopted in embodiment 8.

The high-refractive-index material is silicon, the low-refractive-index is air, α=55.9°, β=40°, γ=54.2°, ω=26.7°, b=0.69a, c=0.4692a, d=0.34627a, e=0.36358a. It can be known from the numerical simulation result of this embodiment in FIG. 10 that the large absolute PBG relative value is 14.91%.

Embodiment 9

Figure 11:
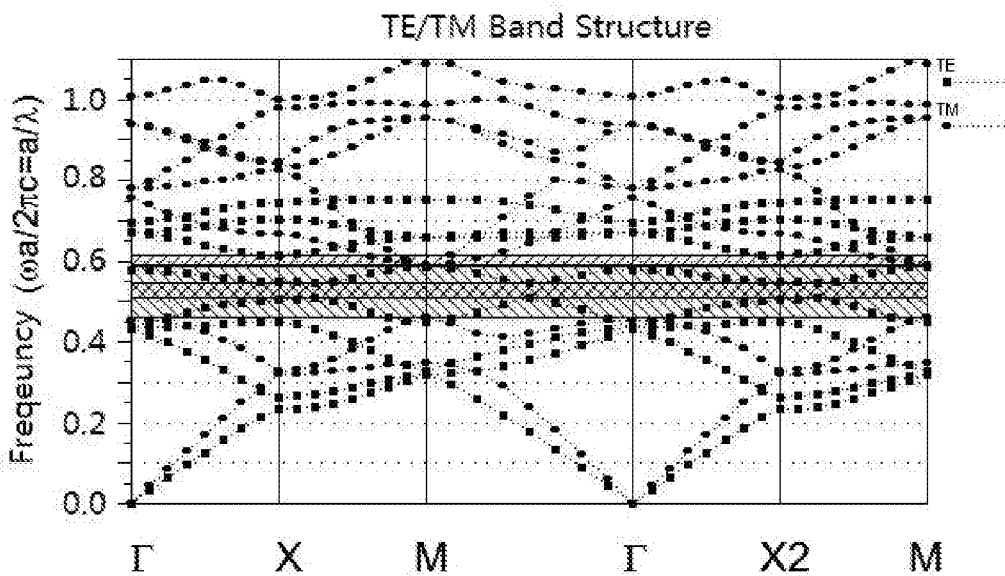
FIG. 11 is a structural diagram of a PBG corresponding to unit cell parameter values adopted in embodiment 9.

The high-refractive-index material is silicon, the low-refractive-index is air, α=55.9°, β=55°, γ=54.2°, ω=26.7°, b=0.69a, c=0.4692a, d=0.34627a, e=0.36358a. It can be known from the numerical simulation result of this embodiment in FIG. 11 that the large absolute PBG relative value is 7.24%.

Embodiment 10

Figure 12:
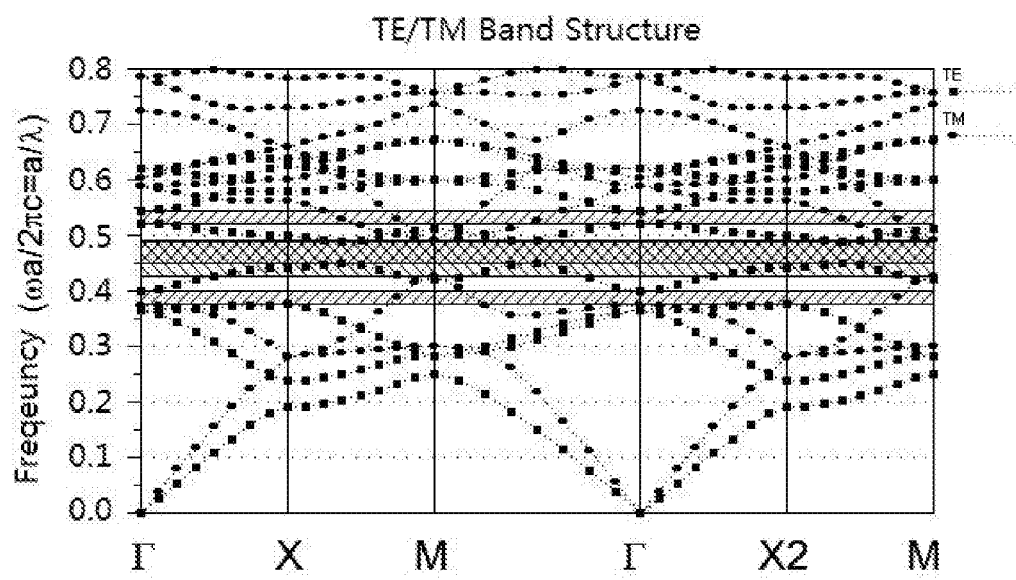
FIG. 12 is a structural diagram of a PBG corresponding to unit cell parameter values adopted in embodiment 10.

The high-refractive-index material is silicon, the low-refractive-index is air, α=55.9°, β=30.2°, γ=54.2°, ω=26.7°, b=0.69a, c=0.276a, d=0.2037a, e=0.2139a. It can be known from the numerical simulation result of this embodiment in FIG. 12 that the large absolute PBG relative value is 8.31%.

Embodiment 11

Figure 13:
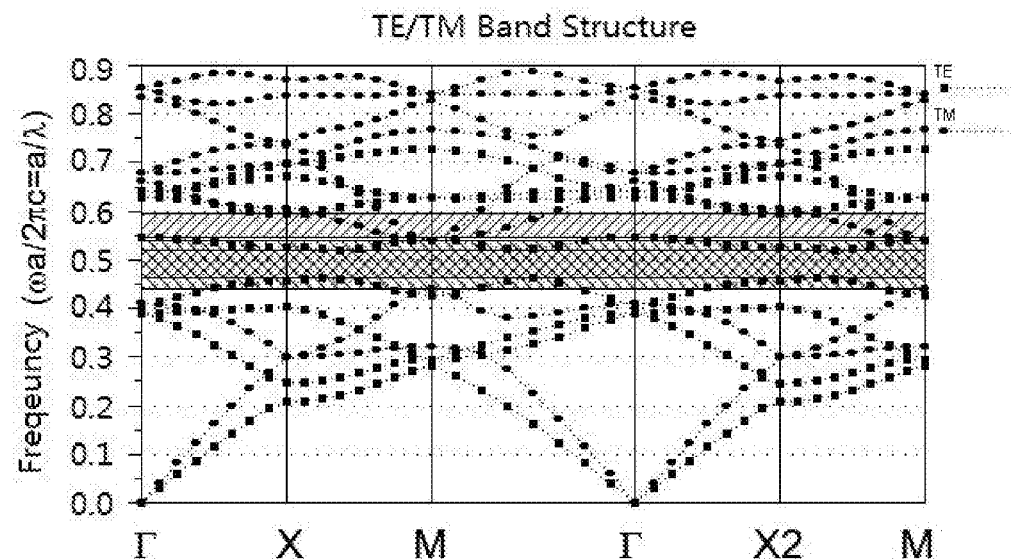
FIG. 13 is a structural diagram of a PBG corresponding to unit cell parameter values adopted in embodiment 11.

The high-refractive-index material is silicon, the low-refractive-index is air, α=55.9°, β=30.2°, γ=54.2°, ω=26.7°, b=0.69a, c=0.3795a, d=0.2801a, e=0.2941a. It can be known from the numerical simulation result of this embodiment in FIG. 13 that the large absolute PBG relative value is 11.93%.

Embodiment 12

Figure 14:
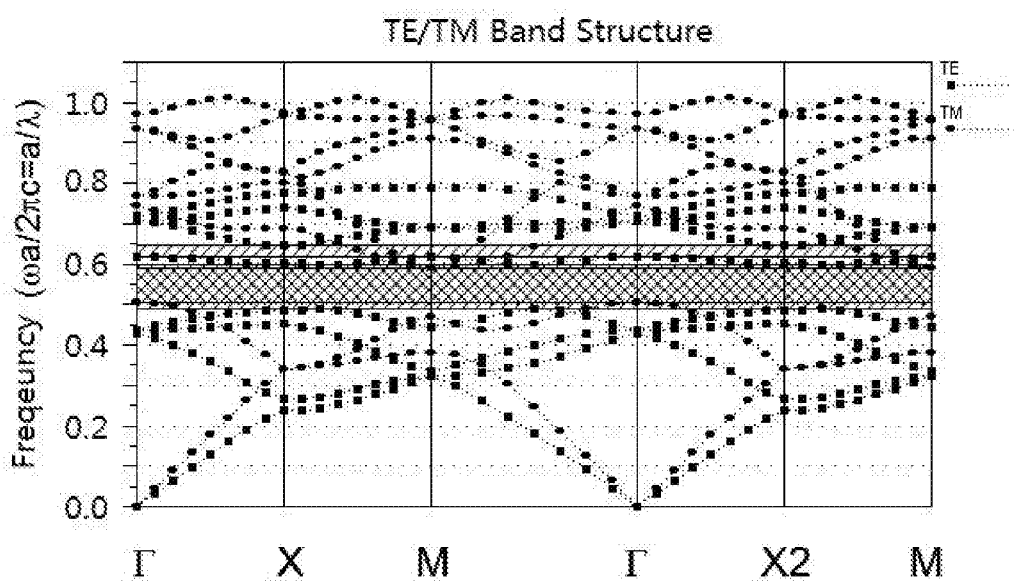
FIG. 14 is a structural diagram of a PBG corresponding to unit cell parameter values adopted in embodiment 12.

The high-refractive-index material is silicon, the low-refractive-index is air, α=55.9°, β=30.2°, γ=54.2°, ω=26.7°, b=0.69a, c=0.483a, d=0.3565a, e=0.3743a. It can be known from the numerical simulation result of this embodiment in FIG. 14 that the large absolute PBG relative value is 15.69%.

Embodiment 13

Figure 15:
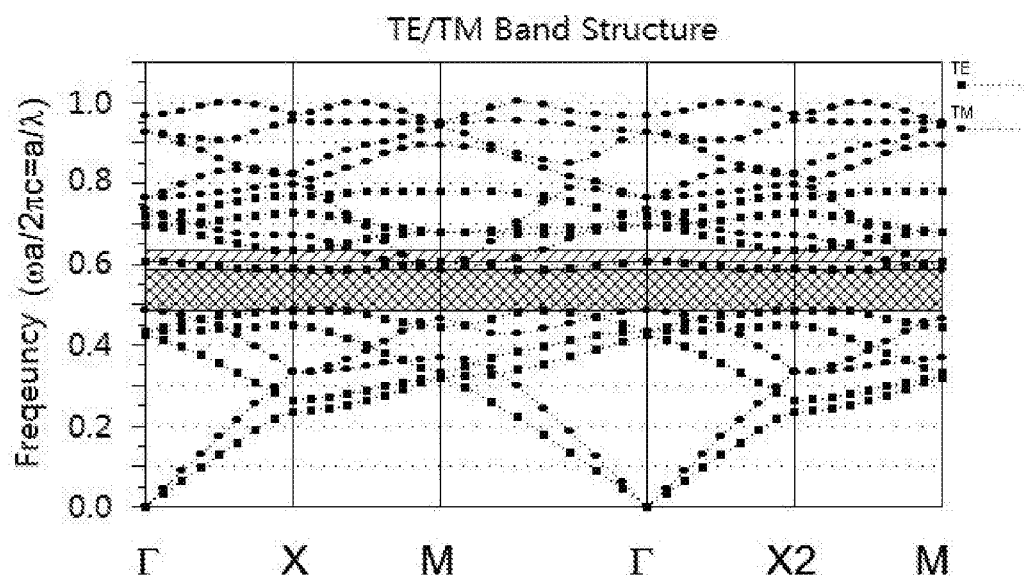
FIG. 15 is a structural diagram of a PBG corresponding to unit cell parameter values adopted in embodiment 13.

The high-refractive-index material is silicon, the low-refractive-index is air, α=55.9°, β=30.2°, γ=40°, ω=26.7°, b=0.69a, c=0.4692a, d=0.34627a, e=0.36358a. It can be known from the numerical simulation result of this embodiment in FIG. 15 that the large absolute PBG relative value is 18.18%.

Embodiment 14

Figure 16:
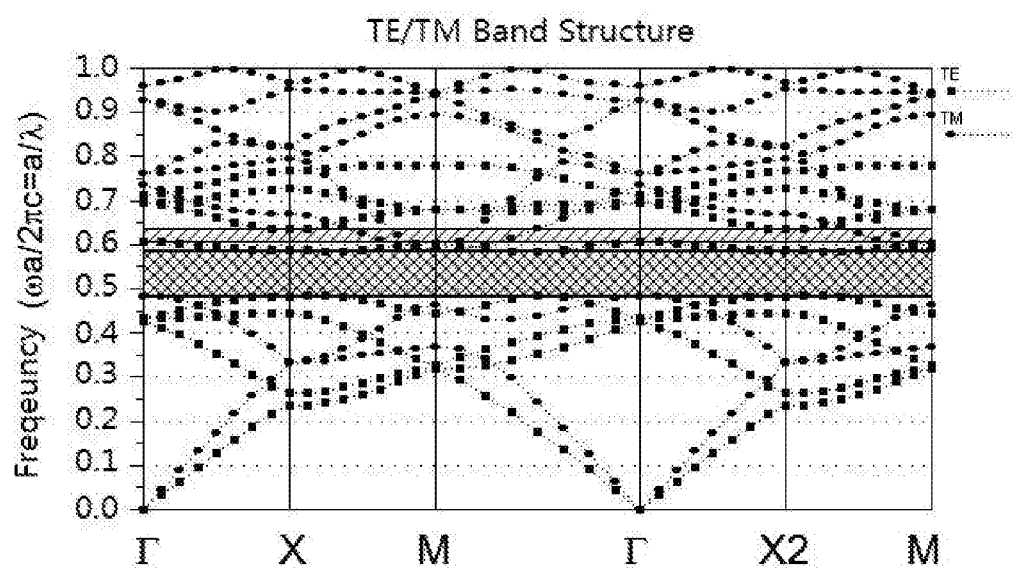
FIG. 16 is a structural diagram of a PBG corresponding to unit cell parameter values adopted in embodiment 14.

The high-refractive-index material is silicon, the low-refractive-index is air, α=55.9°, β=30.2°, γ=46°, ω=26.7°, b=0.69a, c=0.4692a, d=0.34627a, e=0.36358a. It can be known from the numerical simulation result of this embodiment in FIG. 16 that the large absolute PBG relative value is 18.46%.

Embodiment 15

Figure 17:
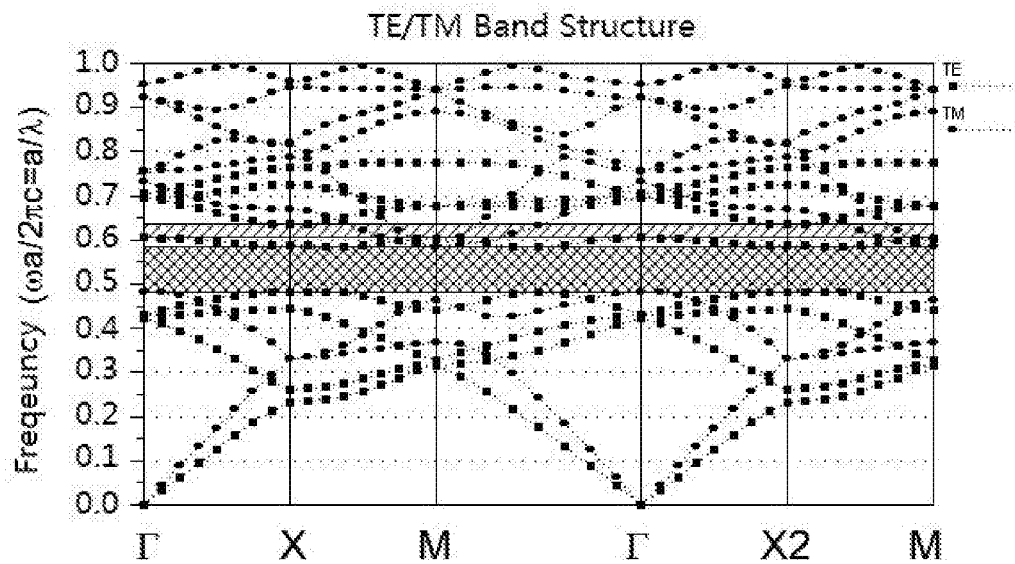
FIG. 17 is a structural diagram of a PBG corresponding to unit cell parameter values adopted in embodiment 14.

The high-refractive-index material is silicon, the low-refractive-index is air, α=55.9°, β=30.2°, γ=55°, ω=26.7°, b=0.69a, c=0.4692a, d=0.34627a, e=0.36358a. It can be known from the numerical simulation result of this embodiment in FIG. 17 that the large absolute PBG relative value is 18.91%.

Embodiment 16

Figure 18:
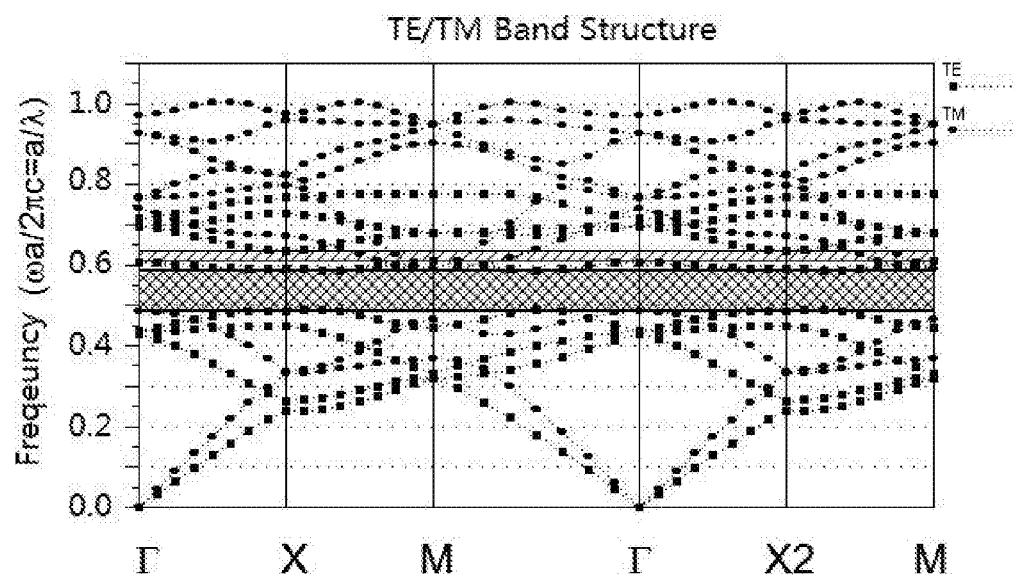
FIG. 18 is a structural diagram of a PBG corresponding to unit cell parameter values adopted in embodiment 16.

The high-refractive-index material is silicon, the low-refractive-index is air, α=55.9°, β=30.2°, γ=54.2°, ω=26.7°, b=0.69a, c=0.4692a, d=0.18768a, e=0.1971. It can be known from the numerical simulation result of this embodiment in FIG. 18 that the large absolute PBG relative value is 18.30%.

Embodiment 17

Figure 19:
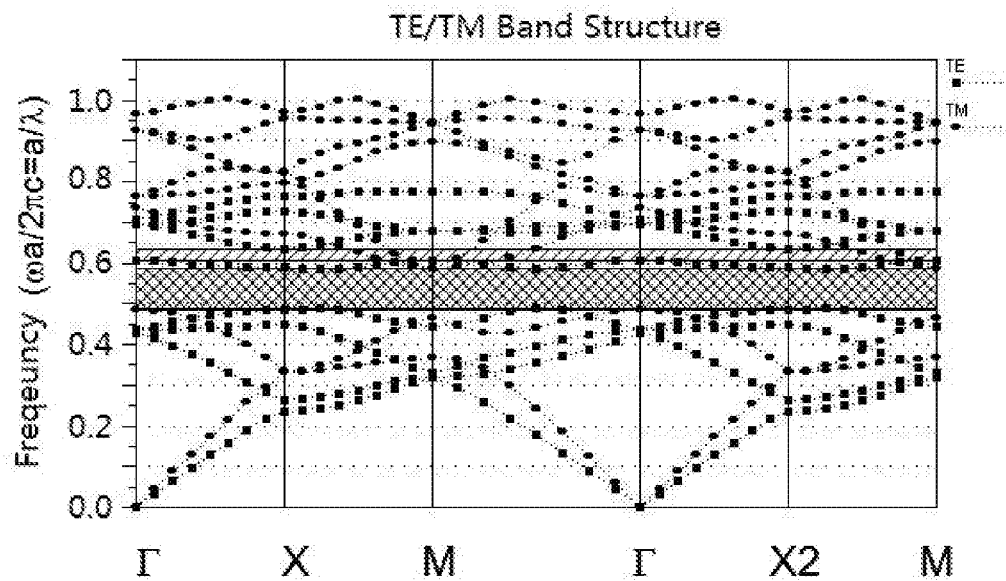
FIG. 19 is a structural diagram of a PBG corresponding to unit cell parameter values adopted in embodiment 17.

The high-refractive-index material is silicon, the low-refractive-index is air, α=55.9°, β=30.2°, γ=54.2°, ω=26.7°, b=0.69a, c=0.4692a, d=0.2581a, e=0.271a. It can be known from the numerical simulation result of this embodiment in FIG. 19 that the large absolute PBG relative value is 18.36%.

Embodiment 18

Figure 20:
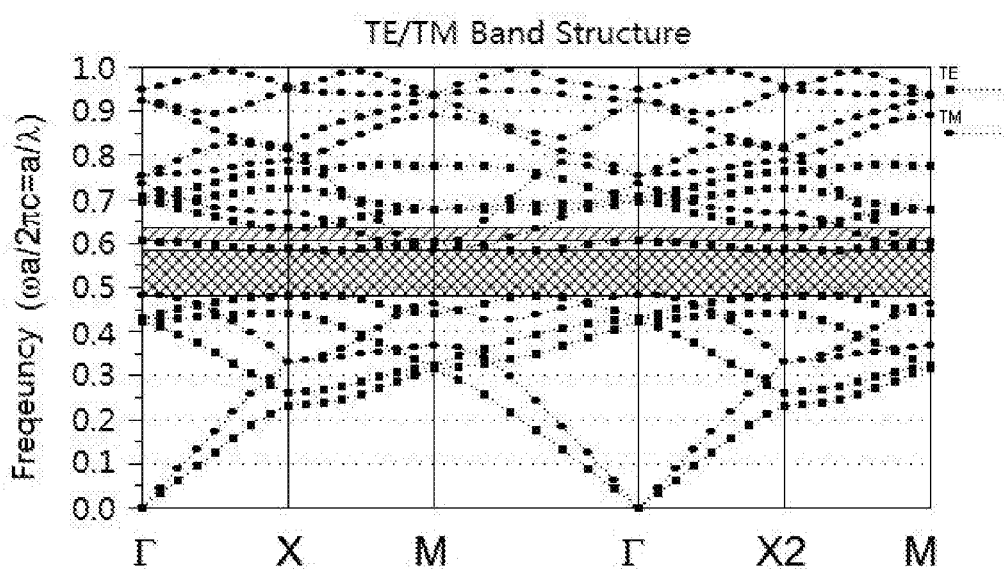
FIG. 20 is a structural diagram of a PBG corresponding to unit cell parameter values adopted in embodiment 18.

The high-refractive-index material is silicon, the low-refractive-index is air, α=55.9°, β=30.2°, γ=54.2°, ω=26.7°, b=0.69a, c=0.4692a, d=0.3519a, e=0.3695a. It can be known from the numerical simulation result of this embodiment in FIG. 20 that the large absolute PBG relative value is 18.89%.

Embodiment 19

Figure 21:
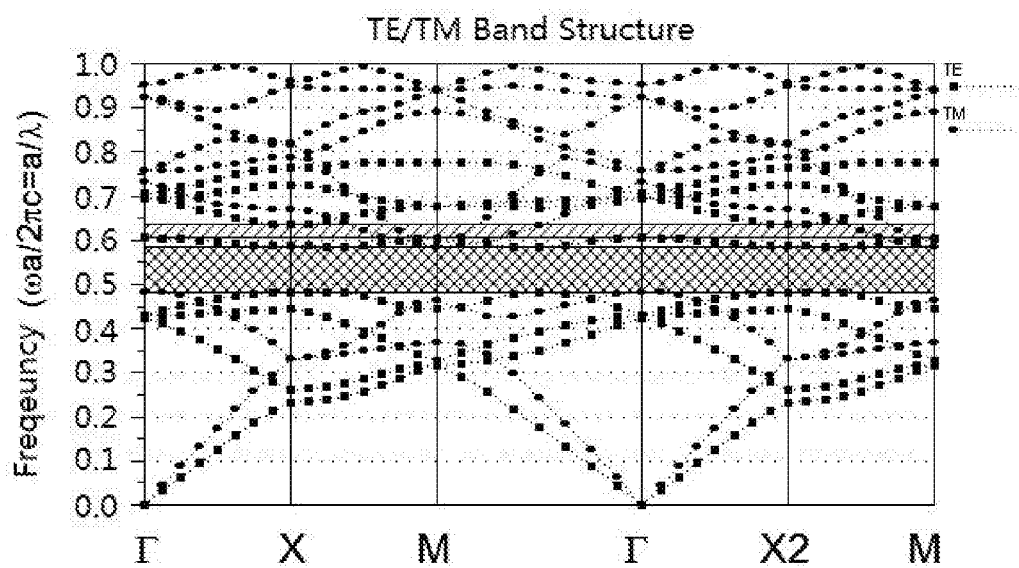
FIG. 21 is a structural diagram of a PBG corresponding to unit cell parameter values adopted in embodiment 19.

The high-refractive-index material is silicon, the low-refractive-index is air, α=55.9°, β=30.2°, γ=54.2°, ω=26°, b=0.69a, c=0.4692a, d=0.34627a, e=0.36358a. It can be known from the numerical simulation result of this embodiment in FIG. 21 that the large absolute PBG relative value is 18.92%.

Embodiment 20

Figure 22:
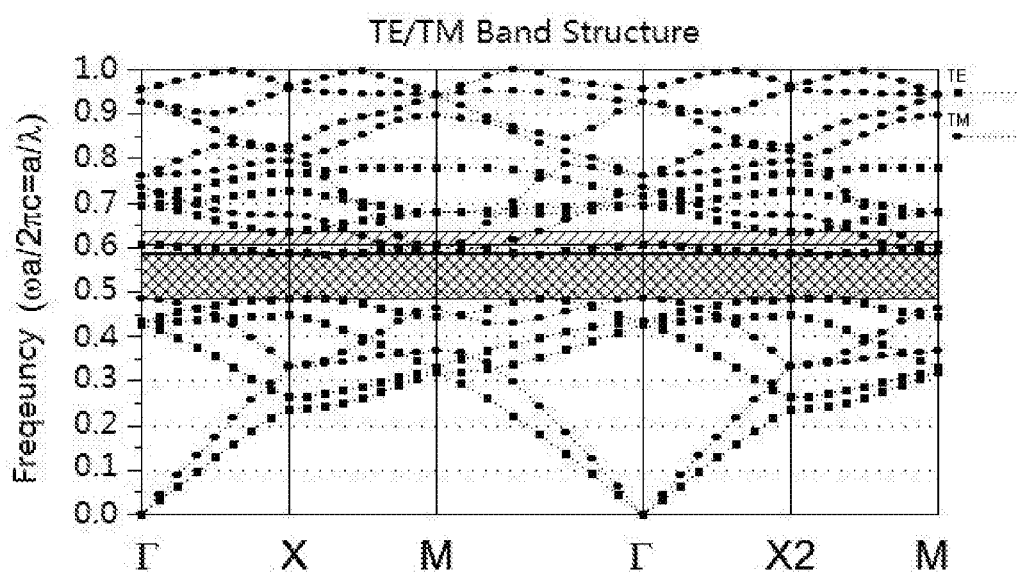
FIG. 22 is a structural diagram of a PBG corresponding to unit cell parameter values adopted in embodiment 20.

The high-refractive-index material is silicon, the low-refractive-index is air, α=55.9°, β=30.2°, γ=54.2°, ω=40°, b=0.69a, c=0.4692a, d=0.34627a, e=0.36358a. It can be known from the numerical simulation result of this embodiment in FIG. 22 that the large absolute PBG relative value is 18.73%.

Embodiment 21

Figure 23:
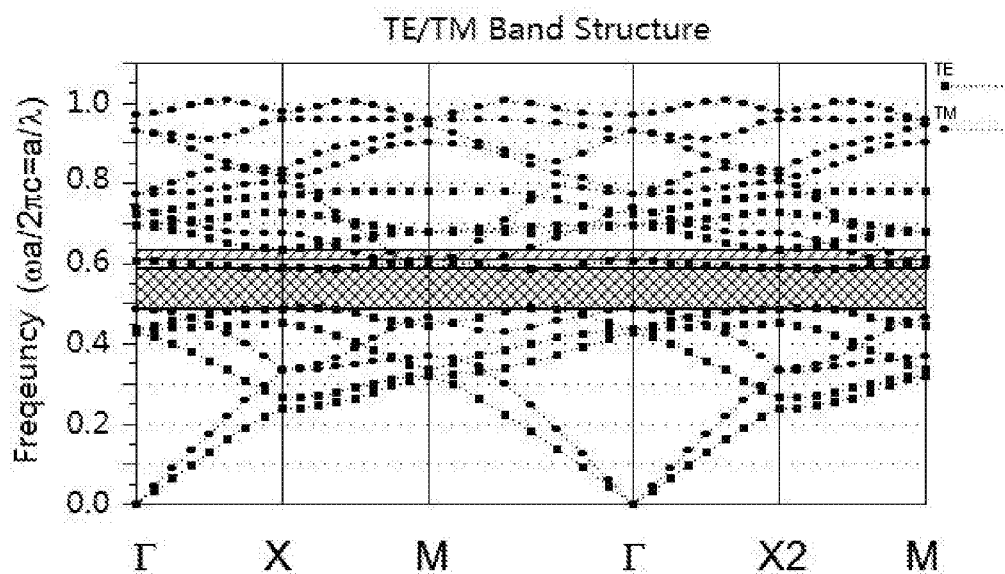
FIG. 23 is a structural diagram of a PBG corresponding to unit cell parameter values adopted in embodiment 21.

The high-refractive-index material is silicon, the low-refractive-index is air, α=55.9°, β=30.2°, γ=54.2°, ω=50°, b=0.69a, c=0.4692a, d=0.34627a, e=0.36358a. It can be known from the numerical simulation result of this embodiment in FIG. 23 that the large absolute PBG relative value is 18.31%.

Embodiment 22

Figure 24:
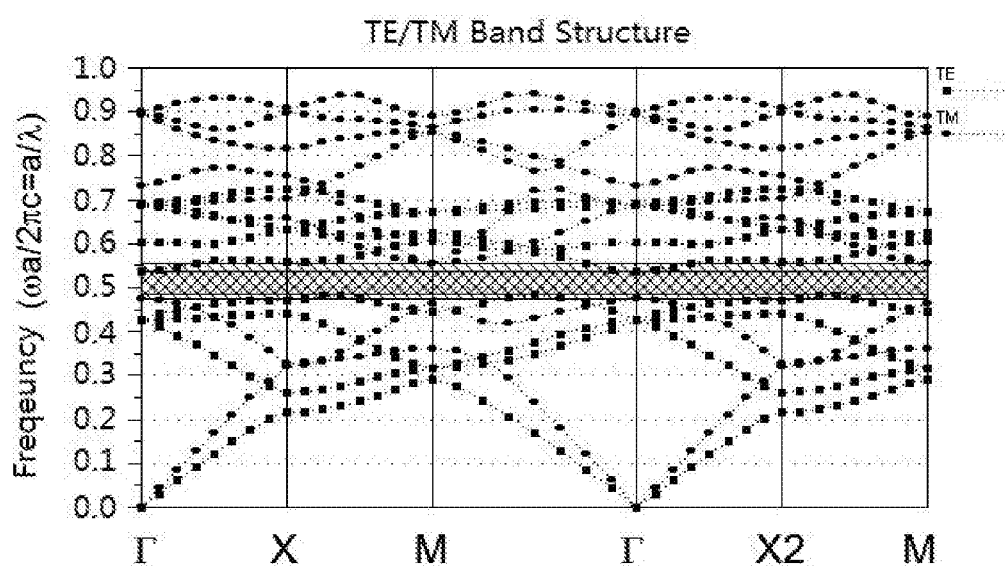
FIG. 24 is a structural diagram of a PBG corresponding to unit cell parameter values adopted in embodiment 22.

The high-refractive-index material is silicon, the low-refractive-index is air, α=55.9°, β=30.2°, γ=54.2°, ω=26.7°, b=0.69a, c=0.4692a, d=0.34627a, e=0.1731a. It can be known from the numerical simulation result of this embodiment in FIG. 24 that the large absolute PBG relative value is 7.54%.

Embodiment 23

Figure 25:
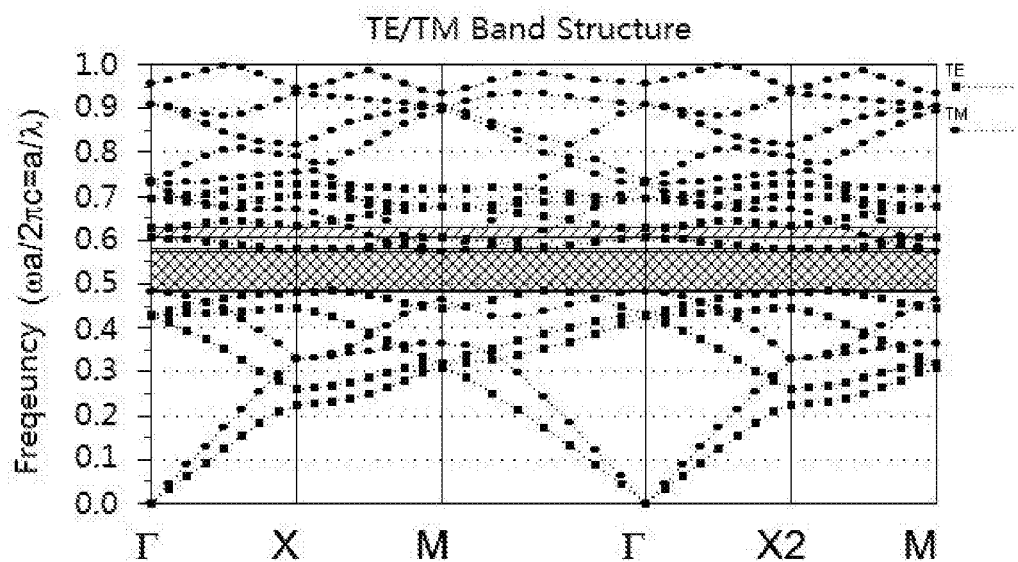
FIG. 25 is a structural diagram of a PBG corresponding to unit cell parameter values adopted in embodiment 23.

The high-refractive-index material is silicon, the low-refractive-index is air, α=55.9°, β=30.2°, γ=54.2°, ω=26.7°, b=0.69a, c=0.4692a, d=0.34627a, e=0.2597a. It can be known from the numerical simulation result of this embodiment in FIG. 25 that the large absolute PBG relative value is 18.91%.

Embodiment 24

Figure 26:
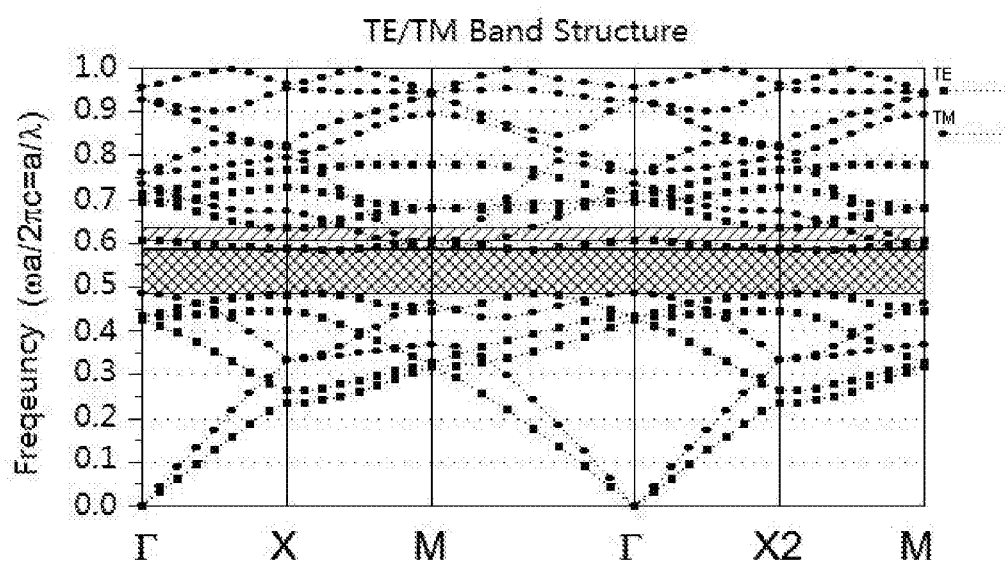
FIG. 26 is a structural diagram of a PBG corresponding to unit cell parameter values adopted in embodiment 24.

The high-refractive-index material is silicon, the low-refractive-index is air, α=55.9°, β=30.2°, γ=54.2°, ω=26.7°, b=0.69a, c=0.4692a, d=0.34627a, e=0.3809a. It can be known from the numerical simulation result of this embodiment in FIG. 26 that the large absolute PBG relative value is 18.82%.

While the invention has been described in terms of various specific embodiments, those skilled in the art will recognize that the invention can be practiced with modification within the spirit and scope of the claims.

What is claimed is:

1. A two-dimensional (2D) square-lattice photonic crystal (PhC) with rotated hollow square rods and triangle rods comprising:
PhC structure formed by unit cells arranged in a square-lattices; the lattice constant of the square-lattice PhC is a; the unit cell of said square-lattice PhC includes a high-refractive-index dielectric rotated hollow square rod, four high-refractive-index dielectric triangle rods and a low-refractive-index background dielectric, the outer contour of said rotated hollow square rod is a first rotated square rod, said first rotated square rod has the rotated angle α of 45 to 60 degrees and the side length b of 0.56a to 0.7a; a cross section of said rotated hollow square rod is a second rotated square rod, and said second rotated square rod has the rotated angle β of 30 to 55 degrees and the side length c of 0.276a to 0.49a; said triangle rods are four right-angle triangle rods, a cross section of said triangle rods are right-angle triangle, said four right-angle triangle rods positioned at the hollow square rod, and the vertex connecting lines of the four right-angle triangle rods form a third rotated square rod; said third rotated square rod has the rotated angle γ of 40 to 55 degrees and the side length d of 0.188a to 0.3472a; the hypotenuse connecting lines of the four right-angle triangle rods form a fourth rotated square rod; said fourth rotated square rod has the rotated angle ω of 26 to 50 degrees and the side length e of 0.173a to 0.382a.

2. The 2D square-lattice PhC with rotated hollow square rods and triangle rods of claim 1, wherein said high-refractive-index dielectric is a dielectric with the refractive index of more than 2.

3. The 2D square-lattice PhC with rotated hollow square rods and triangle rods of claim 1, wherein the high-refractive-index dielectric is silicon, gallium arsenide, or titanium dioxide.

4. The 2D square-lattice PhC with rotated hollow square rods and triangle rods of claim 3, wherein said high-refractive-index dielectric is silicon, the low-refractive-index background dielectric is air, the first rotated square rod with the rotated angle α of 45 to 60 degrees and the side length b of 0.56a to 0.7a; said second rotated square rod with the rotated angle β of 30 to 55 degrees and the side length c of 0.276a to 0.49a; said third rotated square rod with the rotated angle γ of 40 to 55 degrees and the side length d of 0.188a to 0.3472a; the fourth rotated square rod with the rotated angle ω of 26 to 50 degrees and the side length e of 0.173a to 0.382a; a large absolute PBG relative value is 10%.

5. The 2D square-lattice PhC with rotated hollow square rods and triangle rods of claim 3, wherein said high-refractive-index dielectric is silicon, said low-refractive-index background dielectric is air, the first rotated square rod with the rotated angle α of 55.9 degree and the side length b of 0.69a; the second rotated square rod with the rotated angle β of 30.2 degree and the side length c of 0.4692a; the third rotated square rod with the rotated angle γ of 54.2 degree and the side length d of 0.34627a; the fourth rotated square rod with the rotated angle ω of 26.7 degree and the side length e of 0.36358a; a large absolute PBG relative value is 18.936%.

6. The 2D square-lattice PhC with rotated hollow square rods and triangle rods of claim 1, wherein the high-refractive-index dielectric has a refractive index of 3.4.

7. The 2D square-lattice PhC with rotated hollow square rods and triangle rods of claim 1, wherein said low-refractive-index background dielectric is a dielectric with the refractive index of less than 1.6.

8. The 2D square-lattice PhC with rotated hollow square rods and triangle rods of claim 1, wherein the low-refractive-index background dielectric is air, vacuum, magnesium fluoride, or silicon dioxide.

9. The 2D square-lattice PhC with rotated hollow square rods and triangle rods of claim 8, wherein said high-refractive-index dielectric is silicon, said low-refractive-index background dielectric is air, the first rotated square rod with the rotated angle α of 45 to 60 degrees and the side length b of 0.56a to 0.7a; the second rotated square rod with the rotated angle β of 30 to 55 degrees and the side length c of 0.276a to 0.49a; the third rotated square rod with the rotated angle γ of 40 to 55 degrees and the side length d of 0.188a to 0.3472a; the fourth rotated square rod with the rotated angle ω of 26 to 50 degrees and the side length e of 0.173a to 0.382a; a large absolute PBG relative value is 10%.

10. The 2D square-lattice PhC with rotated hollow square rods and triangle rods of claim 8, wherein said high-refractive-index dielectric is silicon, said low-refractive-index background dielectric is air, the first rotated square rod with the rotated angle α of 55.9 degree and the side length b of 0.69a; the second rotated square rod with the rotated angle β of 30.2 degree and the side length c of 0.4692a; the third rotated square rod with the rotated angle γ of 54.2 degree and the side length d of 0.34627a; the fourth rotated square rod with the rotated angle ω of 26.7 degree and the side length e of 0.36358a; a large absolute PBG relative value is 18.936%.

11. The 2D square-lattice PhC with rotated hollow square rods and triangle rods of claim 1, wherein said high-refractive-index dielectric is silicon, the low-refractive-index background dielectric is air, said first rotated square rod with the rotated angle a of 45 to 60 degrees and the side length b of 0.56a to 0.7a; said second rotated square rod with the rotated angle β of 30 to 55 degrees and the side length c of 0.276a to 0.49a; said third rotated square rod with the rotated angle γ of 40 to 55 degrees and the side length d of 0.188a to 0.3472a; said fourth rotated square rod with the rotated angle ω of 26 to 50 degrees and the side length e of 0.173a to 0.382a; a large absolute photonic band gap (PBG) relative value is 10%.

12. The 2D square-lattice PhC with rotated hollow square rods and triangle rods of claim 1, wherein said high-refractive-index dielectric is silicon, the low-refractive-index background dielectric is air, the first rotated square rod with the rotated angle α of 55.9 degree and the side length b of 0.69a; the second rotated square rod with the rotated angle β of 30.2 degree and the side length c of 0.4692a; the third rotated square rod with the rotated angle γ of 54.2 degree and the side length d of 0.34627a; the fourth rotated square rod with the rotated angle ω of 26.7 degree and the side length e of 0.36358a; a large absolute PBG relative value is 18.936%.

* * * * *